United States Patent
McCornack

(10) Patent No.: US 7,505,223 B1
(45) Date of Patent: Mar. 17, 2009

(54) COMPENSATING FOR NON-LINEAR THERMAL EXPANSION WHEN WRITING SPIRAL TRACKS TO A DISK OF A DISK DRIVE

(75) Inventor: Mark R. McCornack, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/850,116

(22) Filed: Sep. 5, 2007

(51) Int. Cl.
*G11B 21/02* (2006.01)
(52) U.S. Cl. ........................................ 360/75
(58) Field of Classification Search ................ None
See application file for complete search history.

(56) References Cited

U.S. PATENT DOCUMENTS

| | | | |
|---|---|---|---|
| 4,107,746 A * | 8/1978 | Conway | 360/78.14 |
| 5,010,535 A | 4/1991 | Davis | |
| 5,668,679 A | 9/1997 | Swearingen et al. | |
| 6,091,564 A | 7/2000 | Codilian et al. | |
| 6,507,450 B1 | 1/2003 | Elliott | |
| 6,937,420 B1 | 8/2005 | McNab et al. | |
| 6,943,978 B1 | 9/2005 | Lee | |
| 6,967,799 B1 | 11/2005 | Lee | |
| 6,977,789 B1 | 12/2005 | Cloke | |
| 6,985,316 B1 | 1/2006 | Liikanen et al. | |
| 6,992,848 B1 | 1/2006 | Agarwal et al. | |
| 6,992,852 B1 | 1/2006 | Ying et al. | |
| 7,002,761 B1 | 2/2006 | Sutardja et al. | |
| 7,016,134 B1 | 3/2006 | Agarwal et al. | |
| 7,054,083 B2 | 5/2006 | Ehrlich | |
| 7,088,533 B1 | 8/2006 | Shepherd et al. | |
| 7,145,744 B1 | 12/2006 | Clawson et al. | |
| 2003/0197968 A1 | 10/2003 | Sacks et al. | |
| 2006/0007585 A1 | 1/2006 | Ehrlich et al. | |
| 2006/0103967 A1 | 5/2006 | Kim et al. | |
| 2006/0171058 A1 | 8/2006 | Chan et al. | |
| 2006/0171059 A1 | 8/2006 | Chan et al. | |

OTHER PUBLICATIONS

US 6,906,885, 06/2005, Agarwal et al. (withdrawn)

* cited by examiner

*Primary Examiner*—K. Wong
(74) *Attorney, Agent, or Firm*—Howard H. Sheerin, Esq.

(57) ABSTRACT

A method of writing spiral tracks for a disk drive is disclosed. A first concentric reference track is written at a first radial location near an outer diameter of a disk surface, a second concentric reference track is written at a second radial location near an inner diameter of the disk surface, and a third concentric reference track is written at a third radial location between the first and second radial locations. Prior to writing one of the spiral tracks, the concentric reference tracks are read to generate position error signals used to adjust a velocity profile for writing the spiral tracks. The velocity profile is adjusted to compensate for linear and non-linear disturbances due, for example, to thermal expansion.

18 Claims, 9 Drawing Sheets

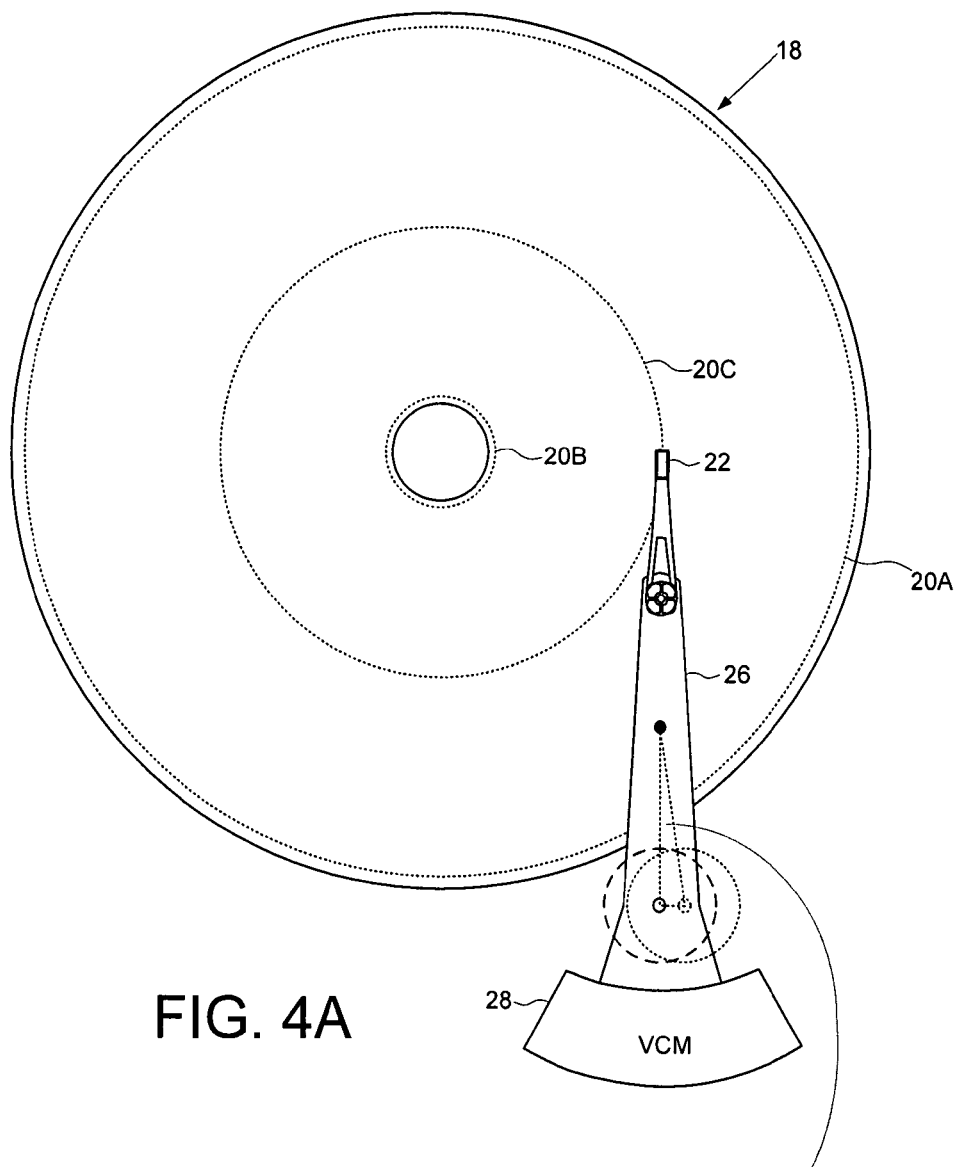
FIG. 4A
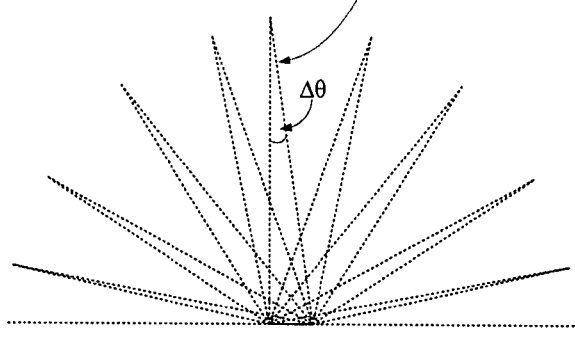
FIG. 4C
FIG. 4B

COMPENSATING FOR NON-LINEAR THERMAL EXPANSION WHEN WRITING SPIRAL TRACKS TO A DISK OF A DISK DRIVE

BACKGROUND

1. Field

The present invention relates to disk drives for computer systems. In particular, the present invention compensates for non-linear thermal expansion when writing spiral tracks to a disk of a disk drive.

2. Description of the Related Art

When manufacturing a disk drive, product servo sectors $2_0$-$2_N$ are written to a disk 4 which define a plurality of radially-spaced, concentric servo tracks 6 as shown in the prior art disk format of FIG. 1. The product servo sectors are said to form servo wedges or servo spokes from the outer to inner diameter of the disk. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the product servo sectors at the appropriate circular location as well as at the appropriate frequency.

In order to write the product servo sectors at the proper disk locations during the self-servo writing operation, it is important for the spiral tracks to be written to the disk with a uniform spacing between the spiral tracks. If an external spiral servo writer is used to write the spiral tracks individually, various components of the external spiral servo writer as well as the disk itself may experience thermal expansion. If the spiral tracks are written without compensating for this thermal expansion, the resulting non-uniform spacing between the spiral tracks may degrade and/or render the product servo sectors inoperable.

There is, therefore, a need to compensate for thermal expansion when writing spiral tracks to a disk of a disk drive.

SUMMARY OF THE EMBODIMENTS OF THE INVENTION

An embodiment of the present invention comprises a method of writing spiral tracks for a disk drive. A first concentric reference track is written at a first radial location near an outer diameter of a disk surface, a second concentric reference track is written at a second radial location near an inner diameter of the disk surface, and a third third concentric reference track is written at a third radial location between the first and second radial locations. Prior to writing one of the spiral tracks, a head is positioned over the first concentric reference track and the first concentric reference track is read to generate a first position error signal representing an offset of the head from the first radial location. The head is positioned over the second concentric reference track and the second concentric reference track is read to generate a second position error signal representing an offset of the head from the second radial location. The head is positioned over the third concentric reference track and the third concentric reference track is read to generate a third position error signal in response to the first position error signal, the second position error signal, and the third radial location. A velocity profile for writing the spiral track is adjusted in response to the first, second, and third position error signals.

In one embodiment, the third radial location is near a middle diameter of the disk surface.

In another embodiment, the head is coupled to a distal end of an actuator arm, the actuator arm is rotated about a pivot, and an encoder rotates with the actuator arm. If the third position error signal comprises a first polarity, the velocity profile is adjusted to accelerate the encoder prior to writing the spiral track and decelerate the encoder while writing the spiral track. If the third position error signal comprises a second polarity opposite the first polarity, the velocity profile is adjusted to accelerate the encoder prior to writing the spiral track and accelerate the encoder while writing the spiral track. In one embodiment, a rotational axis of the encoder is displaced from the pivot.

In another embodiment, the velocity profile while writing the spiral track comprises a substantially sinusoidal component, and in one embodiment a magnitude of the sinusoidal component is based on a magnitude of the third position error signal. In one embodiment, the velocity profile while writing the spiral track compensates for a substantially sinusoidal position error between the rotational position of the actuator arm and the rotational position of the encoder.

In one embodiment, the velocity profile while writing the spiral track comprises a substantially sine component, and in another embodiment, the velocity profile while writing the spiral track comprises a substantially linear component that estimates the sinusoidal component. In one embodiment, a slope of the linear component is based on a magnitude of the third position error signal.

In still another embodiment, the reference tracks are written on a first disk surface, and the spiral tracks are written on a second disk surface in response to the reference tracks written on the first disk surface. In one embodiment, product servo sectors are written in concentric servo tracks on the first disk surface in response to the spiral tracks written on the second disk surface. In another embodiment, product servo sectors are written in concentric servo tracks on multiple disk surfaces in response to the spiral tracks written on the second disk surface.

Another embodiment of the present invention comprises a method of writing spiral tracks for a disk drive. A concentric reference track is written to a first disk surface at a first radial location. A head is positioned over the concentric reference track and the concentric reference track is read to generate a position error signal representing an offset of the head from the first radial location. A velocity profile is adjusted in response to the position error signal, and a spiral track is written to a second disk surface in response to the adjusted velocity profile.

BRIEF DESCRIPTION OF THE DRAWINGS

FIGS. 4A-4C illustrate how thermal expansion may cause a shift between the axis of the position encoder and the pivot of the actuator arm that causes a sinusoidal position error when writing the spiral tracks.

DETAILED DESCRIPTION OF EMBODIMENTS OF THE INVENTION

Figure 2B:
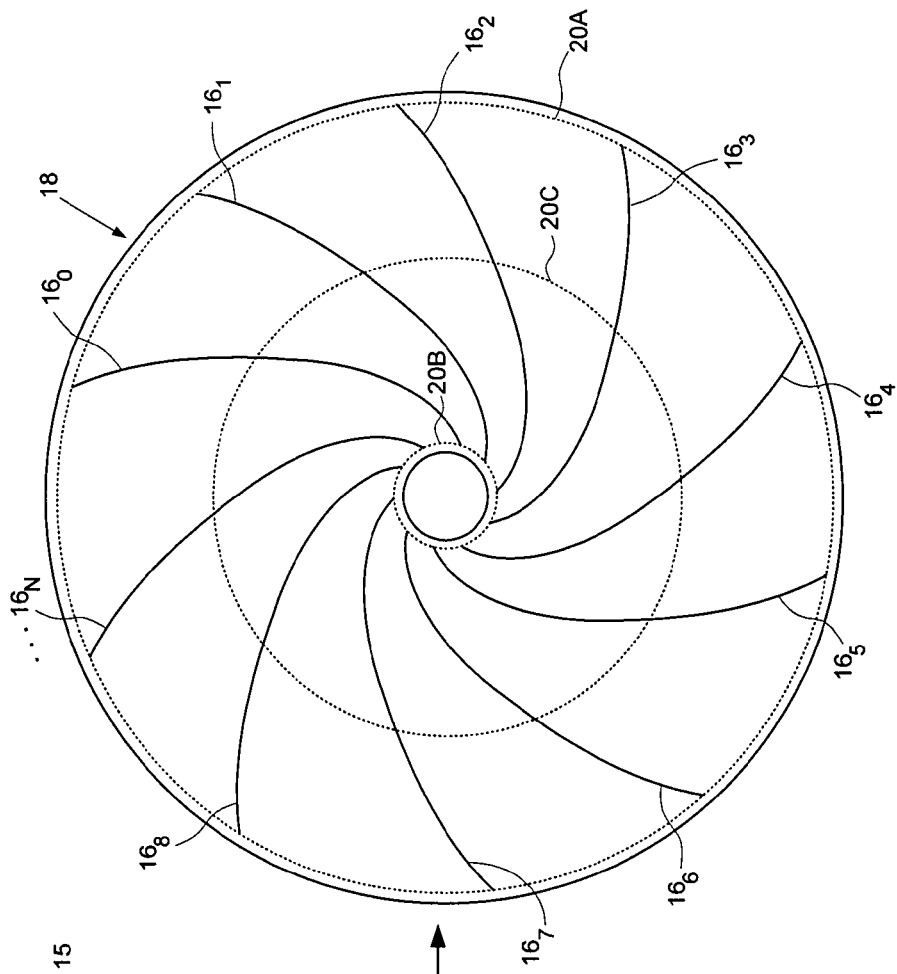
FIG. 2B shows a disk format according to an embodiment of the present invention comprising a plurality of reference tracks and spiral tracks.
Figure 2A:
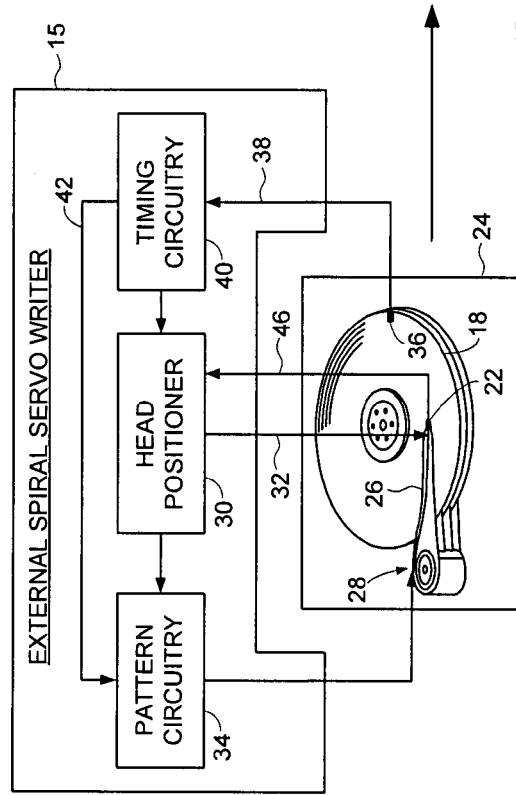
FIG. 2A shows an external spiral servo writer according to an embodiment of the present invention for writing reference tracks and spiral tracks to a disk of a disk drive.

FIG. 2A shows an external spiral servo writer 15 for writing spiral tracks $16_0$-$16_N$ to a disk surface 18 according to an embodiment of the present invention. A first concentric reference track 20A is written at a first radial location near an outer diameter of the disk surface 18, a second concentric reference track 20B is written at a second radial location near an inner diameter of the disk surface 18, and a third concentric reference track 20C is written at a third radial location between the first and second radial locations. Prior to writing one of the spiral tracks $16_i$, a head 22 is positioned over the first concentric reference track 20A and the first concentric reference track 20A is read to generate a first position error signal representing an offset of the head 22 from the first radial location. The head 22 is positioned over the second concentric reference track 20B and the second concentric reference track 20B is read to generate a second position error signal representing an offset of the head 22 from the second radial location. The head 22 is positioned over the third concentric reference track 20C and the third concentric reference track 20C is read to generate a third position error signal in response to the first position error signal, the second position error signal, and the third radial location. A velocity profile for writing the spiral track $16_i$ is adjusted in response to the first, second, and third position error signals.

The third concentric reference track 20C may be written at any suitable location between the first and second concentric reference tracks 20A and 20B, and in the embodiment shown in FIG. 2A, the third concentric reference track 20C is written near a middle diameter of the disk surface 18.

The spiral tracks $16_0$-$16_N$ may be written to the disk using any suitable technique, such as using an external spiral servo writer 15 which writes the spiral tracks to the disk after being installed into the head disk assembly (HDA) of the disk drive as shown in FIG. 2A. Alternatively, the spiral tracks may be written on the disk using an external media writer, and then installing one or more of the disks into the HDA. In yet another embodiment, the spiral tracks are "self written" by each disk drive using an internal position encoder and the internal control circuitry.

In the embodiment of FIG. 2A, the disk drive comprises a head disk assembly (HDA) 24 including the disk 18 and the head 22 coupled to a distal end of an actuator arm 26. During normal operation, a voice coil motor 28 rotates the actuator arm 26 about a pivot to position the head 22 radially over the disk 18. When writing the spiral tracks $16_0$-$16_N$ to the disk surface 18, the external spiral servo writer 15 employs a head positioner 30 for actuating a head positioning pin 32 using sensitive positioning circuitry, such as a laser interferometer. Pattern circuitry 34 generates the data sequence written to the disk surface 18 for the spiral tracks $16_0$-$16_N$ (e.g., a high frequency signal periodically interrupted by sync marks). The external spiral servo writer 15 inserts a clock head 36 into the HDA 24 for writing a clock track at an outer diameter of the disk surface 18. The clock head 36 then reads the clock track to generate a clock signal 38 processed by timing recovery circuitry 40 to synchronize a write clock 42 for writing the spiral tracks $16_0$-$16_N$ to the disk surface 18. The timing recovery circuitry 40 enables the pattern circuitry 34 at the appropriate time relative to the write clock 42 so that the spiral tracks $16_0$-$16_N$ are written at the appropriate circumferential location. The timing recovery circuitry 40 also enables the pattern circuitry 34 relative to the write clock 42 to write the sync marks within the spiral tracks $16_0$-$16_N$ at the same circumferential location from the outer diameter to the inner diameter of the disk surface 18. The constant interval between sync marks (independent of the radial location of the head 22) enables a servo write clock to maintain synchronization while writing the product servo sectors to the disk.

Figure 3:
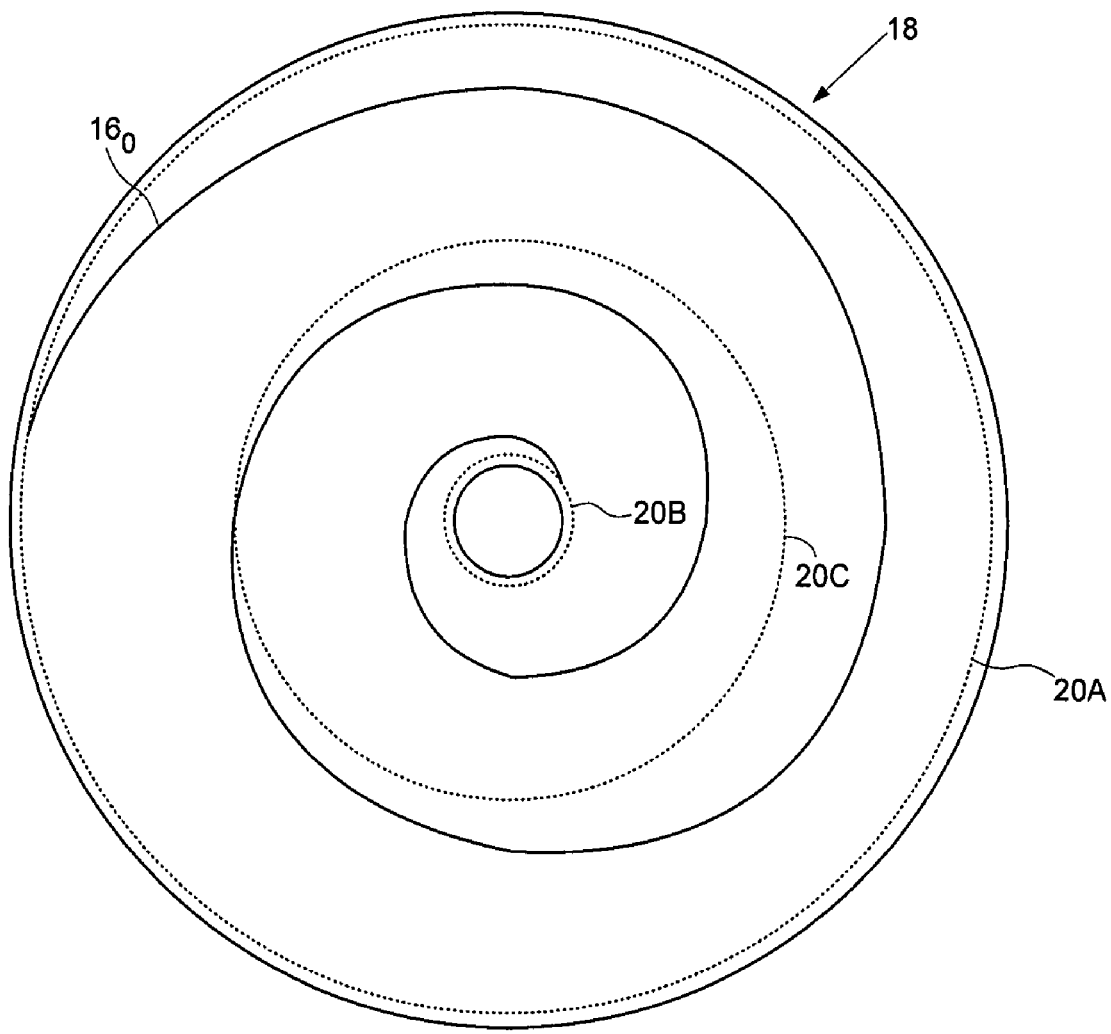
FIG. 3 shows an embodiment of the present invention wherein each spiral track is written over multiple disk revolutions.

In the embodiment of FIG. 2B, each spiral track $16_i$ is written over a partial revolution of the disk surface 18. In an alternative embodiment, each spiral track $16_i$ is written over one or more revolutions of the disk surface 18. FIG. 3 shows an embodiment wherein each spiral track $16_i$ is written over multiple revolutions of the disk surface 18.

In one embodiment, the head positioner 30 actuates the head positioning pin 32 from a starting radial location near the outer diameter of the disk to an ending radial location near the inner diameter of the disk. The head positioning pin 32 is moved according to a velocity profile that ensures the shape of each spiral track remains substantially constant (and therefore the spacing between the spiral tracks remains substantially constant). To facilitate this, the head positioner 30 positions the head 22 at a first radial location (using an encoder) and writes the first concentric reference track 20A at the first radial location (e.g., at the outer diameter of the disk surface 18). The head positioner 30 positions the head 22 at a second radial location (using the encoder) and writes the second concentric reference track 20B at the second radial location (e.g., at the inner diameter of the disk surface 18). During the process of writing the spiral tracks to the disk surface 18, the radial location of the concentric reference tracks 20A and 20B may shift relative to the head positioning pin 32 due to thermal expansion. That is, the radial location of the concentric reference tracks 20A and 20B may shift relative to the first and second radial locations used by the head positioner 30 to initially write the concentric reference tracks 20A and 20B (as determined from the encoder).

As the various components expand (e.g., the disk 18), the starting location of each spiral track changes as well as the length of each spiral track. Thus, prior to writing each spiral track the head positioner 30 detects the offset of the concentric reference tracks 20A and 20B relative to their initial radial locations (as determined by the encoder). The offsets are then used by the head positioner 30 to adjust a starting radial location as well as a velocity profile used to write each spiral track to the disk surface 18.

Figure 1:
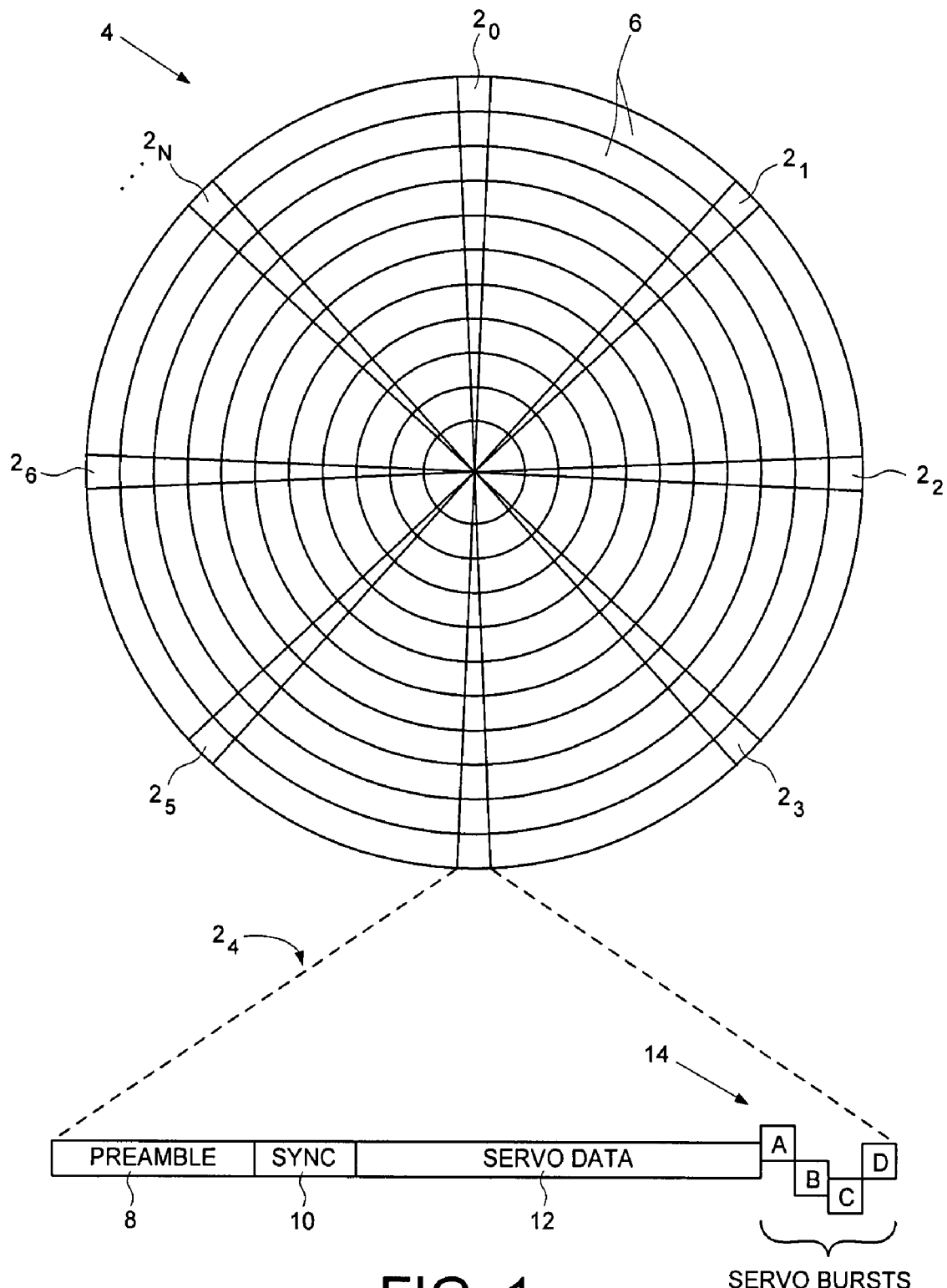
FIG. 1 shows a prior art disk format comprising a plurality of concentric tracks with embedded servo sectors.

In one embodiment, the concentric reference tracks 20A and 20B comprise N concentric servo sectors similar to the conventional servo sector 24 shown in FIG. 1. Prior to writing a spiral track, the head positioner 30 searches for the radial location of the first concentric reference track 20A by processing the read signal 46 emanating from the head 22 and detecting a sync mark recorded in the servo sector. Once the concentric reference track 20A is located, the head positioner 30 may "lock" the radial position of the head 22 while reading the remaining servo sectors. In one embodiment, a band of concentric reference tracks are written and the center track within the band is selected as the concentric reference track 20A. This embodiment may facilitate generating the position error signal even if the head 22 deviates several tracks away from the concentric reference track 20A as the disk rotates. In an alternative embodiment, the head positioner 30 may track a centerline of the concentric reference track 20A by actuating the head positioning pin 32 in response to the position error signal to thereby track the radial deviation of the head 22 as the disk rotates. In either case, as each servo sector is read, any additional offset detected from the servo bursts 14 (FIG. 1) is included in the position error signal representing the offset from the initial radial location of the first concentric reference track 20A (as determined by the encoder). A similar process is carried out to determine the position error signal representing the offset from the initial radial location of the second concentric reference track 20B.

The position error signals generated for the first and second concentric reference tracks 20A and 20B provide an estimate of the linear position error due to the linear thermal expansion of various components, such as thermal expansion of the disk surface 18. However, thermal expansion may also cause a non-linear position error that may not be detected from the position error signals generated for the first and second concentric reference tracks 20A and 20B. FIG. 4A shows an example of this non-linear position error caused by a shift in the rotational axis of the encoder in the head positioner 30 relative to the pivot axis of the actuator arm 26. FIG. 4B illustrates that the offset in the rotational axis creates a position error that changes relative to the angular position of the actuator arm 26. The position error is represented as the angular difference $\Delta\Theta$ between the actuator arm and the encoder as the actuator arm rotates. As shown in FIG. 4C, the position error $\Delta\Theta$ can be modeled as a sinusoid (e.g., cosine) reaching a maximum value near the middle of the stroke. As illustrated in FIG. 4C, the stroke is actually limited to about ±15 degrees from the middle diameter of the disk surface 18.

If the offset between the axis of the actuator arm 26 and encoder shifts during the spiral writing process (e.g., due to thermal expansion), the magnitude of the sinusoid shown in FIG. 4C will change leading to a sinusoidal position error that is not detected from the first and second concentric reference tracks 20A and 20B. To detect this sinusoidal position error, a third concentric reference track 20C is written at a third radial location between the first and second concentric reference tracks 20A and 20B (e.g., near the middle diameter of the disk surface 18). The position error signal generated for the third concentric reference track 20C relative to the initial radial location provides the estimate of the sinusoidal position error. For example, if the disk expands linearly (causing an equal position error signal for the first and second concentric reference tracks 20A and 20AB) and there is no axial shift, the third position error signal generated for the third reference track 20C will be zero. However, if there is an axial shift, the polarity of the third position error signal will represent the direction of the shift (polarity of the sinusoidal position error), and the magnitude of the third position error signal will represent the magnitude of the shift (magnitude of the sinusoidal position error). If there is a non-linear expansion in the disk surface 18, the magnitude (and possibly polarity) of the first and second position error signals will differ for the first and second concentric for the first and second concentric reference tracks 20A and 20AB. If there is no axial shift, there will be a corresponding expected change in the magnitude and polarity of the third position error signal generated for the third concentric reference track 20C. However, if there is an axial shift, the difference between the expected change in the third position error signal and the actual change in the third position error signal represents the sign and magnitude of the sinusoidal position error.

Figure 5:
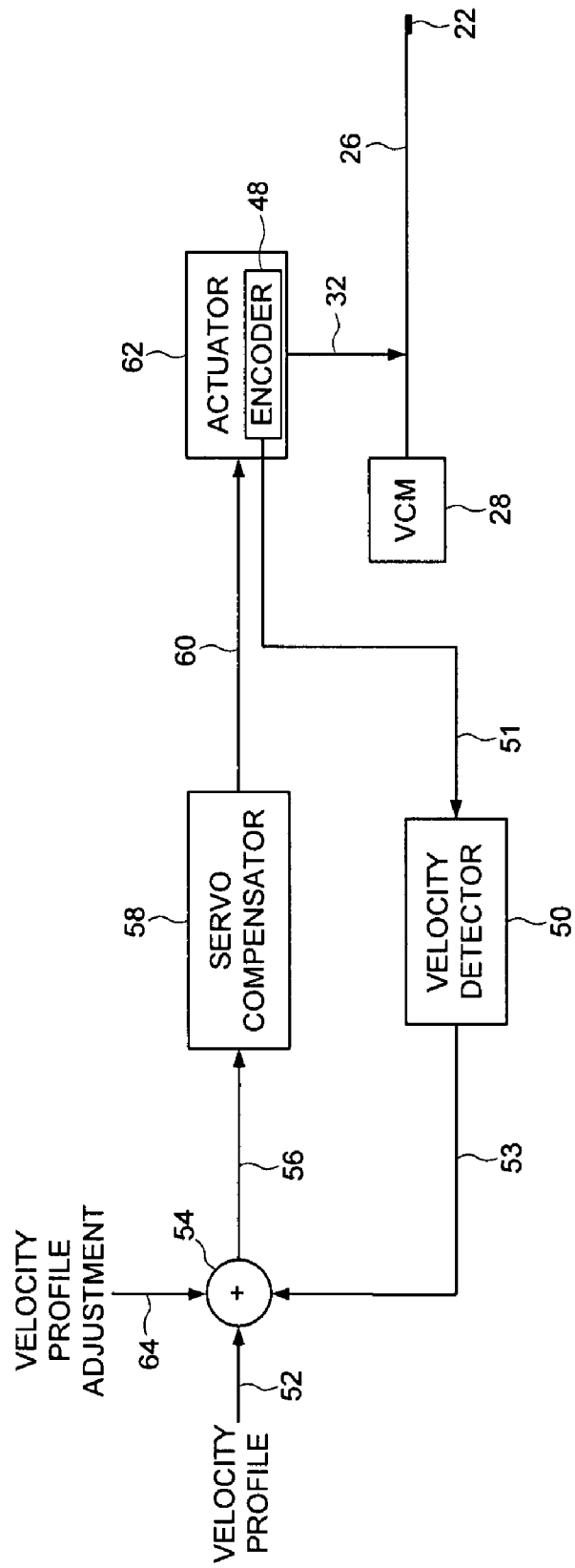
FIG. 5 shows a servo system according to an embodiment of the present invention wherein a velocity profile is adjusted to compensate for the sinusoidal position error.

FIG. 5 shows a servo system implemented within the head positioner 30 according to an embodiment of the present invention. As the actuator arm 26 is rotated about a pivot by the head positioning pin 32, an encoder 48 rotates with the actuator arm 26. A velocity detector 50 processes the output 51 of the encoder 48 to detect an estimated velocity 53 of the encoder (e.g., by computing the derivative of the encoder output 51) thereby providing an estimated angular velocity of the actuator arm 26. The angular velocity 53 of the encoder 48 is subtracted from a velocity profile 52 at adder 54 to generate a velocity error signal 56. The velocity error signal 56 is filtered with a servo compensator 58 to generate a velocity control signal 60 applied to an actuator 62 which actuates the head positioning pin 32 in order to rotate the actuator arm 26 about the pivot while writing a spiral track. Since various components of the spiral servo writing mechanics may fluctuate due, for example, to thermal expansion, there may be a non-linear position error between the encoder 48 and the actuator arm 26. An example of a non-linear position error due to an axial shift between the pivot of the actuator arm 26 and the rotational axis of the encoder 48 is described above with reference to FIGS. 4A-4C.

The non-linear position error (e.g., sinusoidal position error) causes a corresponding velocity error between the encoder 48 and the actuator arm 26. Therefore, in order to rotate the actuator arm 26 at substantially the same velocity while writing all of the spiral tracks (and thereby achieve equal spacing between the spiral tracks), the velocity profile 52 is adjusted with a compensation signal 64 that compensates for the velocity error between the encoder 48 and the actuator arm 26. For example, if the third position error signal described above comprises a first polarity, the velocity profile is adjusted to accelerate the encoder 48 prior to writing the spiral track $16_i$ and decelerate the encoder 48 while writing the spiral track $16_i$. If the third position error signal comprises a second polarity opposite the first polarity, the velocity profile is adjusted to accelerate the encoder 48 prior to writing the spiral track $16_i$ and accelerate the encoder 48 while writing the spiral track.

Figure 6A:
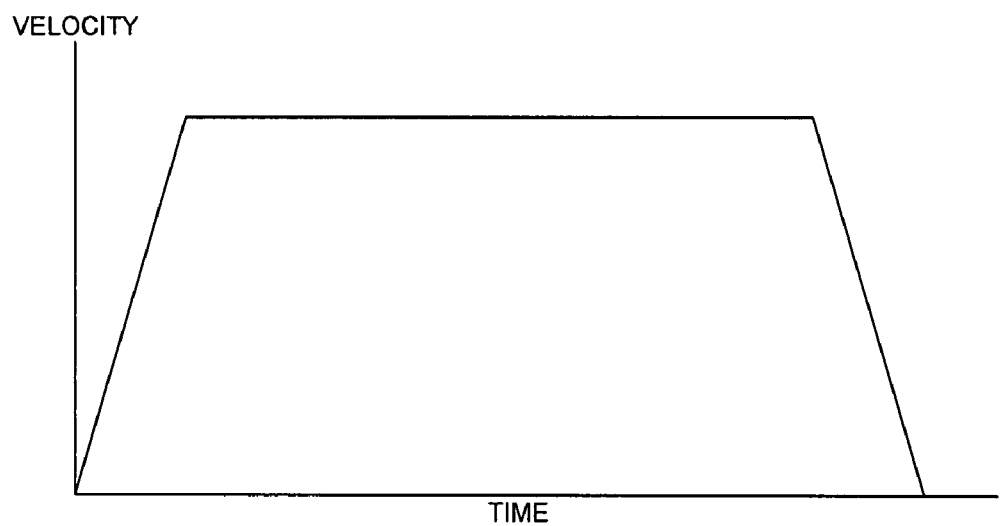
FIG. 6A shows a velocity profile according to an embodiment of the present invention wherein if the sinusoidal position error is zero, the encoder is moved at a constant velocity.
Figure 6B:
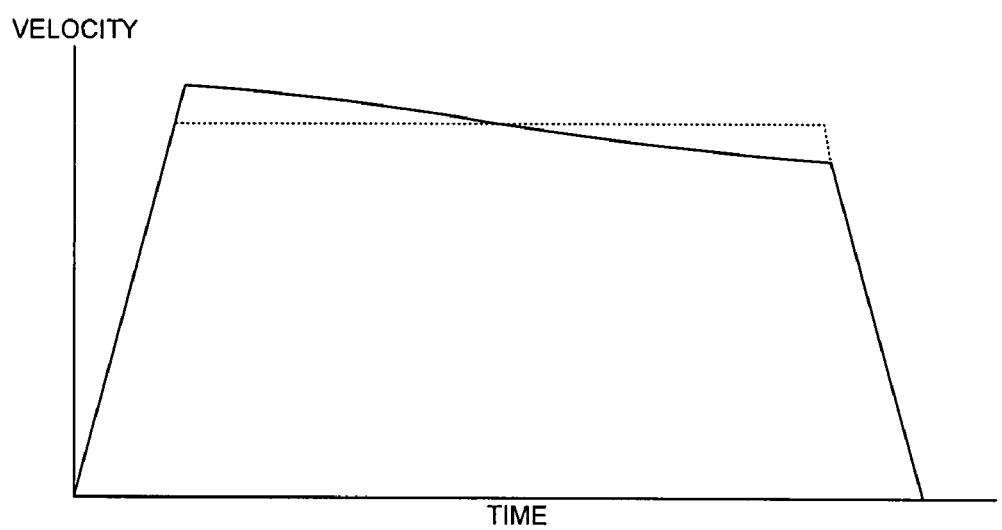
FIG. 6B shows an embodiment of the present invention wherein the velocity profile is adjusted so as to decelerate the encoder while writing a spiral track to compensate for a non-zero sinusoidal position error having a first polarity.
Figure 6C:
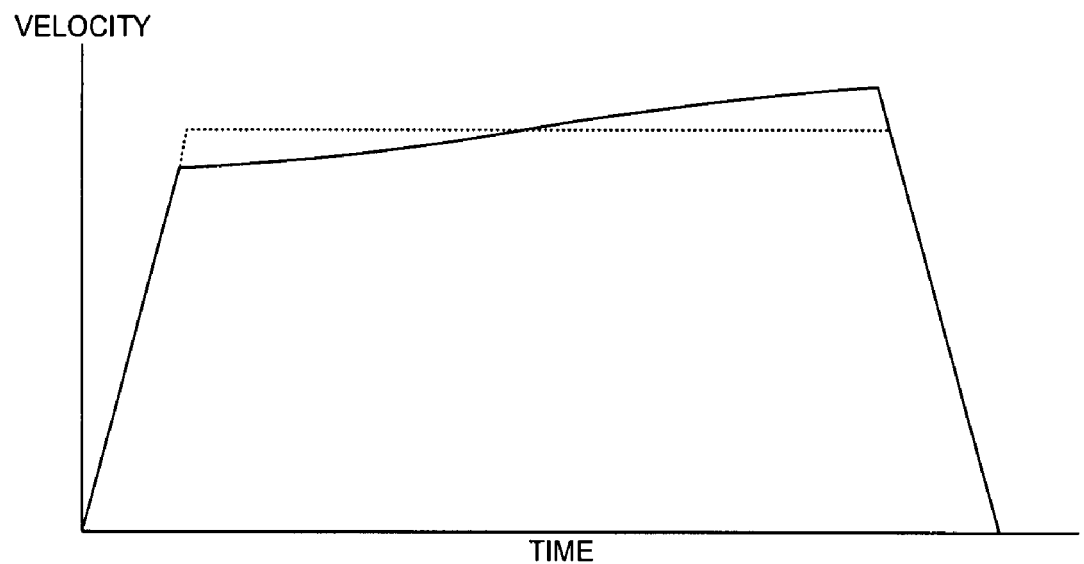
FIG. 6C shows an embodiment of the present invention wherein the velocity profile is adjusted so as to accelerate the encoder while writing a spiral track to compensate for a non-zero sinusoidal position error having a second polarity.

FIG. 6A shows an example velocity profile according to an embodiment of the present invention including a linear acceleration component, a constant velocity component, and a linear deceleration component. In one embodiment, to compensate for the linear position error due to linear thermal expansion (as detected from the first and second concentric reference tracks 20A and 20B), the velocity profile may be scaled (shifted up or down), and in one embodiment, the non-linear position error is compensated by changing the constant velocity component of FIG. 6A into a sinusoidal velocity component as shown in FIG. 6B (the derivative of a sinusoidal position error is a sinusoid and therefore the velocity profile is adjusted by adding a sinusoidal velocity component). The magnitude and sign of the sinusoidal velocity component is chosen relative to the magnitude and sign of the position error signal generated for the third concentric reference track 20C. For example, if the direction of the axial shift is as shown in FIG. 4A, the magnitude and sign of the sinusoidal position error may appear as shown in FIG. 4C and the velocity profile may be adjusted as shown in the exemplary velocity profile of FIG. 6B. If the direction of the axial shift is in the opposite direction, the sign of the sinusoidal position error will flip and the velocity profile may be adjusted as illustrated in an exemplary velocity profile of FIG. 6C. Other magnitudes and slopes of the sinusoidal velocity component may occur depending on the magnitude and sign of the position error signal generated for the third concentric reference track 20C.

Figure 6D:
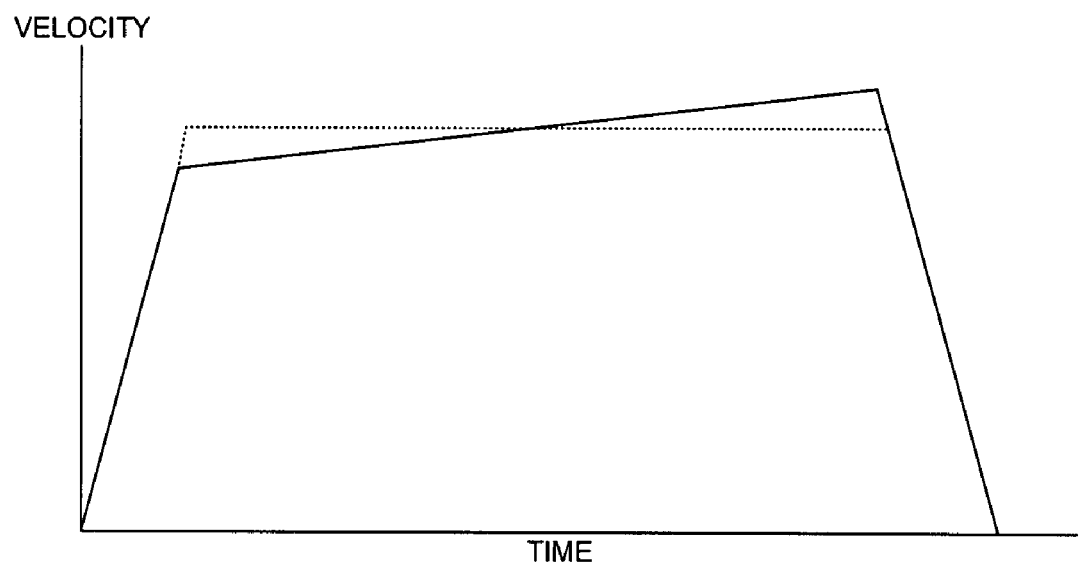
FIG. 6D shows an embodiment of the present invention wherein the velocity profile comprises a linear component that estimates the sinusoidal adjustment shown in FIG. 6C.

In one embodiment, the sinusoidal velocity component is estimated using a straight line which integrates into a parabola (a good estimate of a sinusoid over the range of interest as illustrated in FIG. 4C). For example, instead of converting the constant velocity component into a sinusoidal velocity component shown in FIG. 6C, the constant velocity component is converted into a linear component as shown in FIG. 6D. In one embodiment, a slope of the linear component is based on a magnitude of the third position error signal. This embodiment may simplify the implementation cost and complexity while introducing only a small position error in the spiral tracks.

Figure 7:
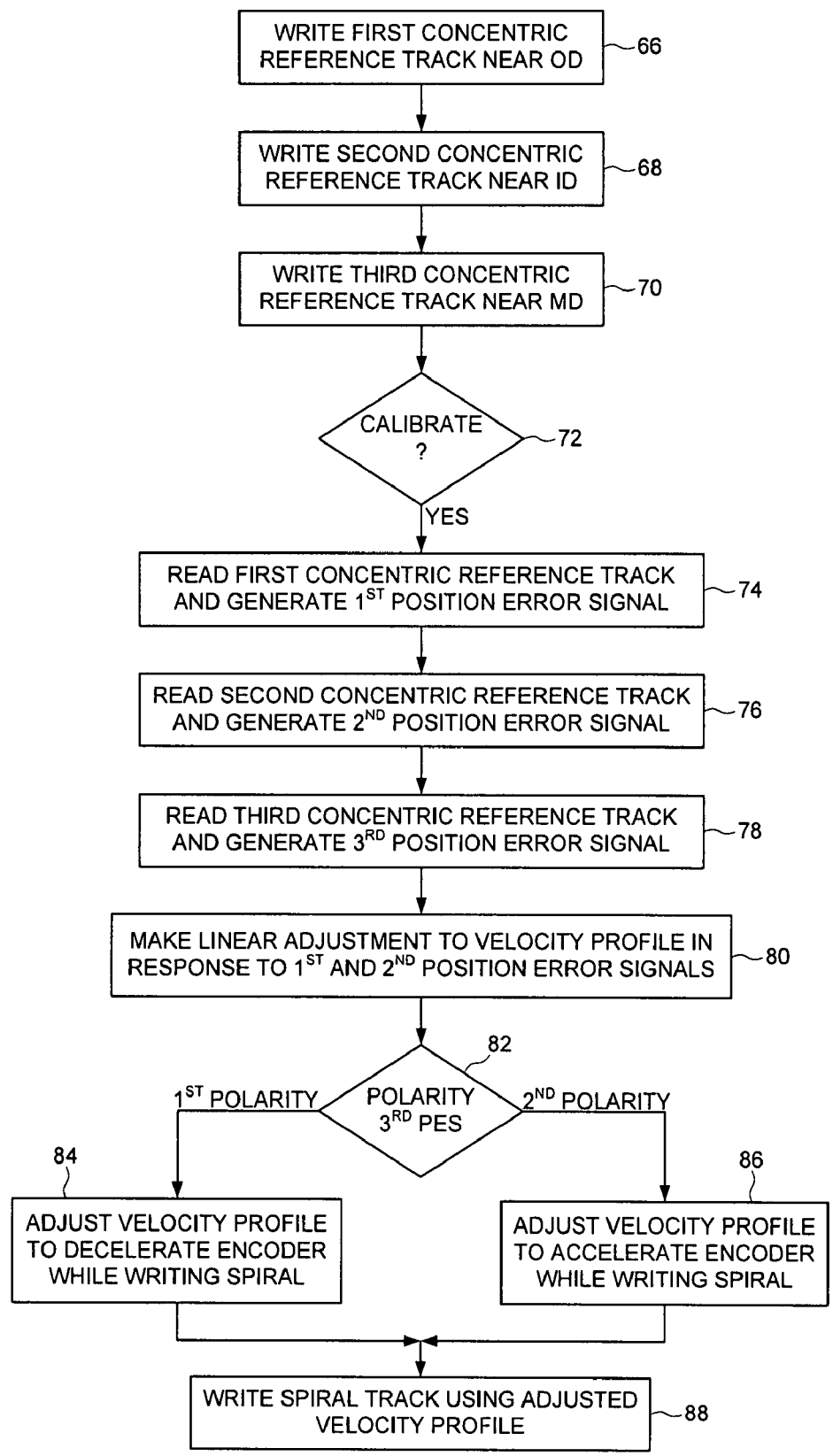
FIG. 7 is a flow diagram according to an embodiment of the present invention for adjusting the velocity profile in response to a polarity of a position error signal generated relative to a detected position of a middle diameter reference track.

FIG. 7 is a flow diagram according to an embodiment of the present invention which may be executed, for example, by the control circuitry of the external spiral servo writer 15 shown in FIG. 2A, by the control circuitry of a media writer, or by the control circuitry internal to a disk drive in an embodiment where the spiral tracks are self-servo written. A first concentric reference track is written near an outer diameter of the disk surface (step 66), a second concentric reference track is written near an inner diameter of the disk surface (step 68), and a third concentric reference track is written near a middle diameter of the disk surface (step 70). At a suitable interval (step 72) during the spiral writing process (e.g., prior to writing every Nth spiral track), the velocity profile is recalibrated to account for the change in the position error (linear and non-linear) due to fluctuations in the mechanical components (e.g., thermal expansion). The control circuitry searches for the first concentric reference track by serving near the last known radial location (determined from the encoder) until the first concentric reference track is read successfully. The corresponding radial location (determined from the encoder) is compared to the initial radial location (determined from the encoder) to generate a first position error signal (step 74). The control circuitry performs a similar operation to generate a second position error signal for the second concentric reference track (step 76). The control circuitry performs a similar operation for the third concentric reference track, and together with the first and second position error signals, generates a third a third position error signal (step 78) as described above.

A suitable adjustment is made to the velocity profile (e.g., scaling the velocity profile) in response to the first and second position error signals (step 80) to compensate for the linear position error. If the third position error signal has a first polarity (step 82), then the velocity profile is adjusted to decelerate the encoder while writing a spiral track (step 84), and if the third position error signal has a second polarity (step 82), then the velocity profile is adjusted to accelerate the encoder while writing a spiral track (step 86), for example, as described above with reference to FIGS. 6A-6D. The spiral track is then written to the disk surface using the adjusted velocity profile (step 88).

In the embodiment shown in FIG. 2B, the concentric reference tracks 20A, 20B and 20C as well as the spiral tracks $16_0$-$16_N$ are written on the same disk surface 18. However, because the spiral tracks $16_0$-$16_N$ overwrite the middle reference track 20C, it may interfere with the ability to read the middle reference track 20C. Therefore, in an alternative embodiment the concentric reference tracks 20A, 20B and 20C are written on a first disk surface and the spiral tracks $16_0$-$16_N$ are written on a second disk surface. In one embodiment, the spiral tracks $16_0$-$16_N$ are written to multiple disk surfaces, and the disk surface that exhibits the highest quality spiral track signal is selected to servo write the product servo sectors $2_0$-$2_N$ to all of the disk surfaces.

Figure 8:
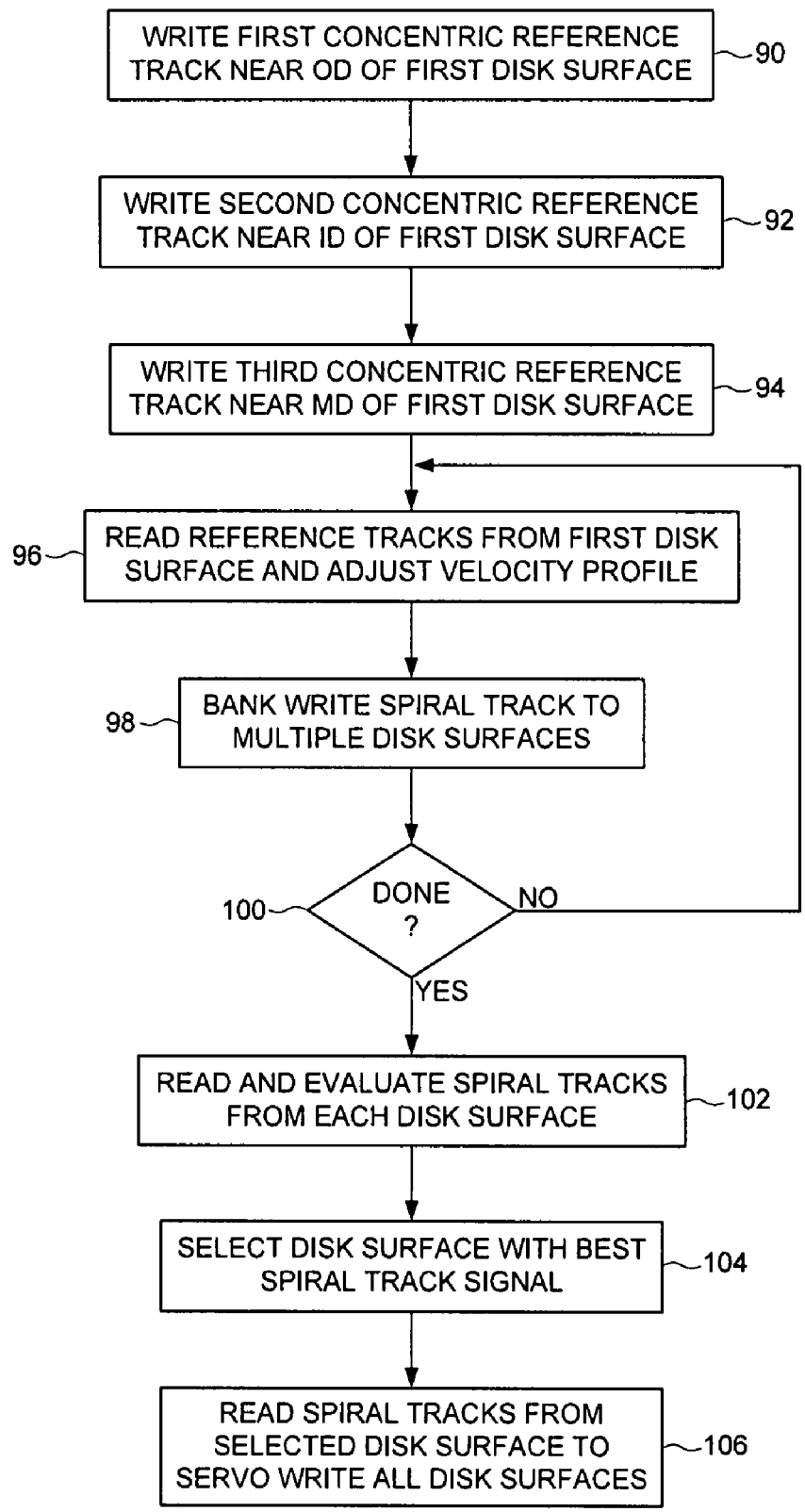
FIG. 8 is a flow diagram according to an embodiment of the present invention wherein the concentric reference tracks are written on a first disk surface and then used to adjust the velocity profile for writing spiral tracks to a second disk surface.

This embodiment is illustrated in the flow diagram of FIG. 8 wherein a first concentric reference track is written near the outer diameter of a first disk surface (step 90), a second concentric reference track is written near the inner diameter of the first disk surface (step 92), and a third concentric reference track is written near the middle diameter of the first disk surface (step 94). The concentric reference tracks are read from the first disk surface in order to adjust the velocity profile (step 96) as described above, and a plurality of other disk surfaces are bank written with a spiral track using the adjusted velocity profile (step 98). This process is repeated until all of the spiral tracks tracks are written (step 100).

Prior to writing the product servo sectors $2_0$-$2_N$, the spiral tracks are read (step 102) from each disk surface and evaluated to determine which disk surface has the highest quality spiral track signal (step 104). The spiral tracks are then read and processed from the selected disk surface in order to bank write the product servo sectors to all of the disk surfaces (step 106). In one embodiment, the spiral writing process is performed external to the disk drive (e.g., using an external spiral servo writer or media writer), and the product servo sectors $2_0$-$2_N$ are also written external to the disk drive using a suitable fill station. In an alternative embodiment, the control circuitry internal to the disk drive reads and processes the spiral tracks in order to write the product servo sectors $2_0$-$2_N$ to all of the disk surfaces.

The non-linear position error described above with reference to FIGS. 4A-4C is due to the shift of the encoder axis relative to the pivot axis of the actuator arm. However, other components of the spiral servo writing mechanics may fluctuate (e.g., due to thermal expansion) thereby causing a similar non-linear disturbance in the position error signal. For example, the actuator arm may increase in length due to thermal expansion which may cause a non-linear distortion that is similar to that caused by the axial shift described above. Therefore, the embodiments of the present invention are not limited to any particular source of non-linear disturbance in the position error signal.

What is claimed is:

1. A method of writing spiral tracks for a disk drive, the method comprising:
   writing a first concentric reference track at a first radial location near an outer diameter of a disk surface;
   writing a second concentric reference track at a second radial location near an inner diameter of the disk surface;
   writing a third concentric reference track at a third radial location between the first and second radial locations; and
   prior to writing one of the spiral tracks:
      positioning a head over the first concentric reference track and reading the first concentric reference track;
      generating a first position error signal representing an offset of the head from the first radial location;
      positioning the head over the second concentric reference track and reading the second concentric reference track;
      generating a second position error signal representing an offset of the head from the second radial location;
      positioning the head over the third concentric reference track and reading the third concentric reference track;
      generating a third position error signal in response to the first position error signal, the second position error signal, and the third radial location; and
      adjusting a velocity profile for writing the spiral track in response to the first, second, and third position error signals.

2. The method as recited in claim 1, wherein the third radial location is near a middle diameter of the disk surface.

3. The method as recited in claim 1, wherein:
   the head is coupled to a distal end of an actuator arm;
   the actuator arm is actuated about a pivot;
   an encoder rotates with the actuator arm;
   if the third position error signal comprises a first polarity, the velocity profile is adjusted to accelerate the encoder prior to writing the spiral track and decelerate the encoder while writing the spiral track; and
   if the third position error signal comprises a second polarity opposite the first polarity, the velocity profile is adjusted to accelerate the encoder prior to writing the spiral track and accelerate the encoder while writing the spiral track.

4. The method as recited in claim 3, wherein a rotational axis of the encoder is displaced from the pivot.

5. The method as recited in claim 3, wherein the velocity profile while writing the spiral track comprises a substantially sinusoidal component.

6. The method as recited in claim 5, wherein a magnitude of the sinusoidal component is based on a magnitude of the third position error signal.

7. The method as recited in claim 5, wherein the velocity profile while writing the spiral track compensates for a substantially sinusoidal position error between the rotational position of the actuator arm and the rotational position of the encoder.

8. The method as recited in claim 5, wherein the velocity profile while writing the spiral track comprises a substantially sine component.

9. The method as recited in claim 5, wherein the velocity profile while writing the spiral track comprises a substantially linear component that estimates the sinusoidal component.

10. The method as recited in claim 9, wherein a slope of the linear component is based on a magnitude of the third position error signal.

11. The method as recited in claim 1, wherein:
   the reference tracks are written on a first disk surface; and
   the spiral tracks are written on a second disk surface in response to the reference tracks written on the first disk surface.

12. The method as recited in claim 11, further comprising writing product servo sectors in concentric servo tracks on the first disk surface in response to the spiral tracks written on the second disk surface.

13. The method as recited in claim 11, further comprising writing product servo sectors in concentric servo tracks on multiple disk surfaces in response to the spiral tracks written on the second disk surface.

14. A method of writing spiral tracks for a disk drive, the method comprising:
   writing a concentric reference track to a first disk surface at a first radial location;
   positioning a head over the concentric reference track and reading the concentric reference track;
   generating a position error signal representing an offset of the head from the first radial location;
   adjusting a velocity profile in response to the position error signal; and
   writing a spiral track to a second disk surface in response to the adjusted velocity profile.

15. The method as recited in claim 14, further comprising writing product servo sectors in concentric servo tracks on the first disk surface in response to the spiral tracks written on the second disk surface.

16. The method as recited in claim 14, further comprising writing product servo sectors in concentric servo tracks on multiple disk surfaces in response to the spiral tracks written on the second disk surface.

17. An apparatus for writing spiral tracks for a disk drive, the apparatus comprising:
   a means for writing a first concentric reference track at a first radial location near an outer diameter of a disk surface;
   a means for writing a second concentric reference track at a second radial location near an inner diameter of the disk surface;
   a means for writing a third concentric reference track at a third radial location between the first and second radial locations; and
   prior to writing one of the spiral tracks:
      a means for positioning a head over the first concentric reference track and reading the first concentric reference track;
      a means for generating a first position error signal representing an offset of the head from the first radial location;

a means for positioning the head over the second concentric reference track and reading the second concentric reference track;
   a means for generating a second position error signal representing an offset of the head from the second radial location;
   a means for positioning the head over the third concentric reference track and reading the third concentric reference track;
   a means for generating a third position error signal in response to the first position error signal, the second position error signal, and the third radial location; and
   a means for adjusting a velocity profile for writing the spiral track in response to the first, second, and third position error signals.

18. An apparatus of writing spiral tracks for a disk drive, the apparatus comprising:
   a means for writing a concentric reference track to a first disk surface at a first radial location;
   a means for positioning a head over the concentric reference track and reading the concentric reference track;
   a means for generating a position error signal representing an offset of the head from the first radial location;
   a means for adjusting a velocity profile in response to the position error signal; and
   a means for writing a spiral track to a second disk surface in response to the adjusted velocity profile.

\* \* \* \* \*